Figure 1:
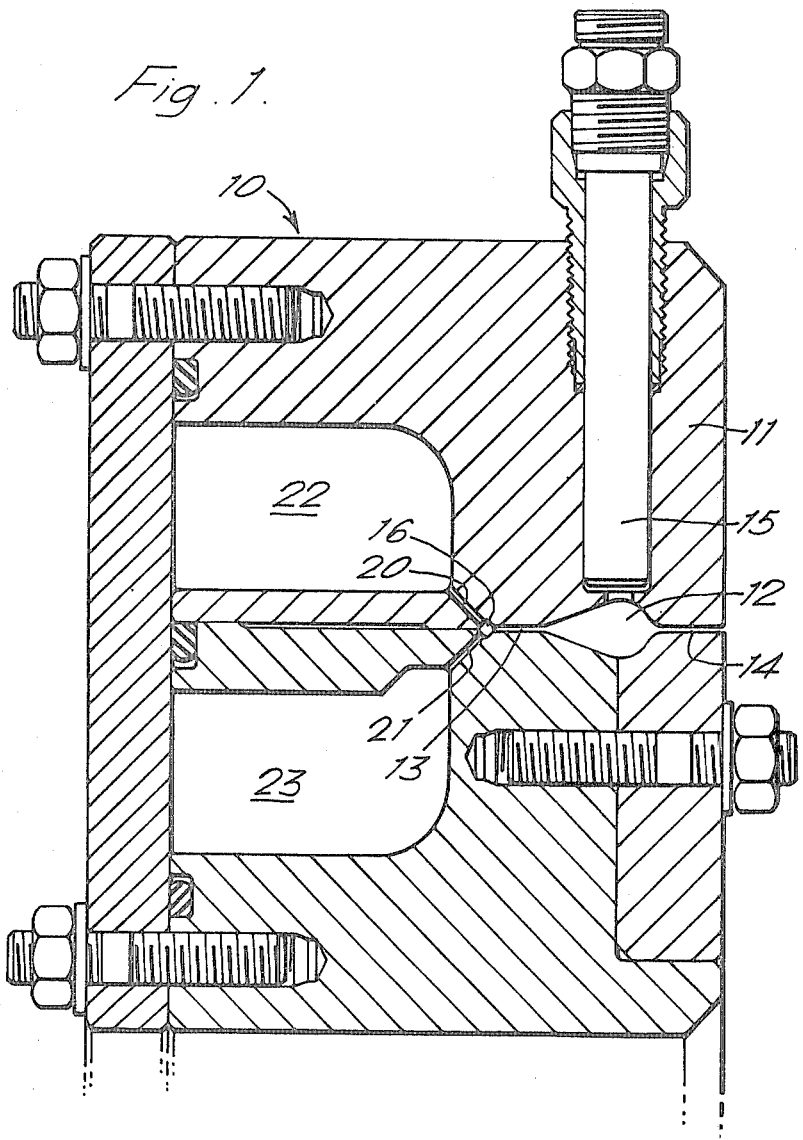

United States Patent

[11] 3,588,298

| [72] | Inventor | Brian Draycott Edwards<br>Derby, England |
|---|---|---|
| [21] | Appl. No. | 831,928 |
| [22] | Filed | June 10, 1969 |
| [45] | Patented | June 28, 1971 |
| [73] | Assignee | Rolls-Royce Limited<br>Derby, England |
| [32] | Priority | June 14, 1968 |
| [33] | | Great Britain |
| [31] | | 28389/68 |

[54] DETONATION WAVE COMBUSTION
10 Claims, 2 Drawing Figs.

[52] U.S. Cl. .................................................. 431/1,
60/39.77, 60/249
[51] Int. Cl. ................................................. F23c 3/02
[50] Field of Search .......................................... 431/1, 2,
114; 60/249 (Inquired), 39.76, 39.77, 247, 39.02

[56] References Cited
UNITED STATES PATENTS

| 1,052,800 | 2/1913 | Corthesy et al. | 60/39.76 |
|---|---|---|---|
| 1,702,731 | 2/1929 | Hymer | 431/1 |
| 1,969,753 | 8/1934 | Holzwarth | 60/39.02 |
| 3,192,716 | 7/1965 | Funk | 431/1X |
| 3,365,880 | 1/1968 | Grebe | 60/249X |

*Primary Examiner*—Frederick L. Matteson
*Assistant Examiner*—Robert A. Dua
*Attorney*—Cushman, Darby and Cushman ABSTRACT: The invention concerns a method of producing combustion gases comprising producing at least one continuously moving combustion-initiating detonation wave in an annular combustion chamber, and successively axially directing through at least one region of the combustion chamber, between the passage of successive waves therepast, a supply of a gaseous oxidant followed by a supply of a detonatable mixture of the gaseous oxidant and of a fuel which is oxidizable thereby, the supply of the gaseous oxidant acting as a barrier layer between the combustion gases and the said mixture to prevent preignition.

PATENTED JUN 28 1971

3,588,298

INVENTOR
BRIAN DRAYCOTT EDWARDS
BY
Cushman, Darby & Cushman
ATTORNEYS

DETONATION WAVE COMBUSTION

This invention concerns improvements relating to detonation wave combustion.

According to one aspect of the present invention, there is provided a method of producing combustion gases comprising producing at least one continuously moving combustion-initiating detonation wave in an annular combustion chamber, and successively axially directing through at least one region of the combustion chamber, between the passage of successive waves therepast, a supply of a gaseous oxidant followed by a supply of a detonatable mixture of the gaseous oxidant and of a fuel which is oxidizable thereby, the supply of the gaseous oxidant acting as a barrier layer between the combustion gases and the said mixture to prevent preignition.

The combustion chamber is preferably permanently open to the supplies of gaseous oxidant and said fuel, the gaseous oxidant being at a predetermined pressure which is less than that of the said wave but exceeds that of the said fuel, whereby when a wave has passed through the said region and the pressure therein has fallen to the said predetermined pressure, the gaseous oxidant will enter the said region, the fuel entering the said region when the pressure therein has fallen further.

The gaseous oxidant is preferably air, whilst the fuel is preferably a gaseous fuel, although it can, if desired, be an atomized liquid fuel.

The gaseous oxidant and the fuel may be supplied to a common mixing chamber before passing to the combustion chamber.

According to another aspect of the present invention, there is provided combustion equipment comprising an annular combustion chamber in which at least one continuously moving combustion-initiating detonation wave may be produced, and means for successively axially directing through at least one region of the combustion chamber, between the passage of successive waves therepast, a supply of a gaseous oxidant followed by a supply of detonatable mixture of the gaseous oxidant and of a fuel which is oxidizable thereby, the supply of the gaseous oxidant being adapted to act as a barrier layer between the combustion gases and the said mixture to prevent preignition.

The combustion chamber is preferably of teardrop shape in cross section.

The combustion chamber may communicate permanently with a mixing chamber which is itself permanently open to supplies of gaseous oxidant and fuel, the gaseous oxidant being at a higher pressure than the fuel. Thus, the mixing chamber may be supplied with gaseous oxidant and fuel from concentrically arranged supply manifolds.

The combustion chamber may be provided on diametrically opposite sides thereof with inlet and outlet ducts.

Figure 2:
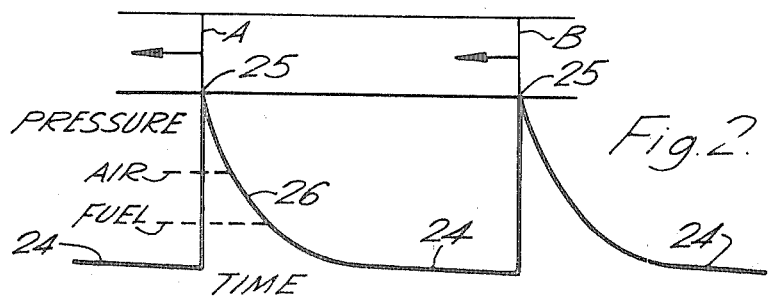

The invention is illustrated, merely by way of example, in the accompanying drawings, in which:

FIG. 1 is a diagrammatic sectional view of part of combustion equipment according to the present invention, and FIG. 2 is a graph illustrating pressure changes in a combustion chamber forming part of the structure shown in FIG. 1.

In FIG. 1 there is shown combustion equipment 10 which has a body 11 in which there is formed a toroidal combustion chamber 12 which is of teardrop shape in cross section. The combustion chamber 12 is provided on diametrically opposite axial sides thereof with inlet and outlet ducts 13,14 respectively, the ducts 13,14 being permanently open to the combustion chamber 12.

An igniter 15, e.g. of the high tension type employed in gas turbine engines, is provided to initiate combustion in the combustion chamber 12. However, in operation, a series of continuously moving combustion-initiating detonation waves travel through the combustion chamber 12, so that the igniter 15 needs to be used only at the start of operations.

The inlet duct 13 permanently communicates with a mixing chamber 16 which itself permanently communicates, by way of annular ducts 20, 21, with annular supply manifolds 22,23.

The supply manifold 22, which is mounted concentrically about the supply manifold 23, is adapted to contain a gaseous fuel such for example, as gaseous ethylene, although other gaseous fuels such as methane or hydrogen may be used, and it is also possible to use an atomized liquid fuel such as atomized kerosene. The annular manifold 23 is adapted to contain a gaseous oxidant for the said fuel. This oxidant is preferably air, or oxygen-enriched air, but may, if desired, be pure oxygen. The pressure of the oxidant in the annular manifold 23 is higher than that of the fuel in the annular manifold 22 for a reason which will appear below.

In FIG. 2 a graph is shown to illustrate the fluctuations in the pressure in a particular region of the combustion chamber 12 as two successive waves A, B pass through this region. As will be seen, the graph has portions 24 which correspond to the basic pressure in the combustion chamber 12, this pressure rising almost instantaneously to maxima 25 as the pressure waves A, B pass. The pressure then decays, as indicated by portions 26 of the graph, in an exponential manner to the said base pressure before the next wave passes. Thus, the continuously moving detonation waves, A, B passing through the combustion chamber 12 produce, at any given region of the combustion chamber, successive peaks of pressure followed by gradual decays of pressure.

As will be appreciated, if a fresh mixture of fuel and oxidant is axially introduced into the combustion chamber 12 immediately after the passage of one of the detonation waves, the hot combustion gases produced by the latter will cause preignition of the mixture of fuel and oxidant, with the result that the combustion chamber will swiftly cease to have a detonation wave constantly moving therethrough.

In the case of the present invention, however, this danger is avoided by reason of the fact that the combustion chamber 12 is permanently open to the oxidant from the manifold 23, the pressure of the oxidant in the latter being at a value below that of the maxima 25 but above that of the fuel. Accordingly, when one of the waves A, B has passed through the said region, and the pressure therein has fallen to the pressure of the oxidant in the manifold 23, the oxidant will enter the said region. Shortly thereafter, when the pressure in the said region has fallen further, the oxidant/fuel mixture will enter the region. Thus the supply of oxidant which enters the region prior to the supply of the detonatable mixture of oxidant and fuel will act as a barrier layer between the hot combustion gases and the said mixture so as to prevent the preignition referred to above.

The present invention thus enables preignition to be avoided without the use of complicated valves, and enables the fresh fuel/oxidant mixture to be introduced at exactly the right point in the very short time available for its introduction.

In one particular case it was found that the maxima 25 corresponded to a pressure of 150 p.s.i., and in this case it was found that the oxidant inlet pressure should be substantially 60 p.s.i., whilst the fuel pressure should be substantially 30 p.s.i.

I claim:

1. A method of producing combustion gases comprising producing at least one continuously moving combustion-initiating detonation wave in an annular combustion chamber, and successively directing axially through at least one region of the combustion chamber, between the passage of successive waves therepast, a supply of a gaseous oxidant followed by a supply of a detonatable mixture of the gaseous oxidant and of a fuel which is oxidizable thereby, the supply of the gaseous oxidant acting as a barrier layer between the combustion gases and the said mixture to prevent preignition.

2. A method as claimed in claim 1 in which the combustion chamber is permanently open to the supplies of gaseous oxidant and said fuel, the gaseous oxidant being at a predetermined pressure which is less than that of the said wave but exceeds that of the said fuel, whereby when a wave has passed through the said region and the pressure therein has fallen to the said predetermined pressure, the gaseous oxidant will enter the said region, the fuel entering the said region when the pressure therein has fallen further.

3. A method as claimed in claim 1 in which the gaseous oxidant is air.

4. A method as claimed in claim 1 in which the fuel is a gaseous fuel.

5. A method as claimed in claim 1 in which the gaseous oxidant and the fuel are supplied to a common mixing chamber before passing to the combustion chamber.

6. Combustion equipment comprising an annular combustion chamber in which at least one continuously moving combustion-initiating denotation wave may be produced, and means for successively directing axially through at least one region of the combustion chamber, between the passage of successive wave therepast, a supply of a gaseous oxidant followed by a supply of a detonatable mixture of the gaseous oxidant and of a fuel which is oxidizable thereby, the supply of the gaseous oxidant acting as a barrier layer between the combustion gases and the said mixture to prevent preignition.

7. Combustion equipment as claimed in claim 6 in which the combustion chamber is of teardrop shape in cross section.

8. Combustion equipment as claimed in claim 6 in which the combustion chamber permanently communicates with a mixing chamber which is itself permanently open to supplies of gaseous oxidant and fuel, the gaseous oxidant being at a higher pressure than the fuel.

9. Combustion equipment as claimed in claim 8 in which the mixing chamber is supplied with gaseous oxidant and fuel from concentrically arranged supply manifolds.

10. Combustion equipment as claimed in claim 6 in which the combustion chamber is provided on diametrically opposite sides thereof with inlet and outlet ducts.